United States Patent [19]
Osugi et al.

[11] Patent Number: 5,970,192
[45] Date of Patent: Oct. 19, 1999

[54] METHOD OF ALIGNING OPTICAL WAVEGUIDE DEVICE

[75] Inventors: Yukihisa Osugi; Ryoichi Hata, both of Nagoya; Yasuharu Kuno, Nishi-kasugai-gun, all of Japan

[73] Assignee: NGK Insulators, Ltd., Japan

[21] Appl. No.: 08/942,615

[22] Filed: Oct. 2, 1997

[30] Foreign Application Priority Data

Oct. 3, 1996 [JP] Japan ................................. 8-262214

[51] Int. Cl.⁶ ............................... G02B 6/24; G02B 6/30
[52] U.S. Cl. ............................ 385/49; 385/50; 385/52; 385/31
[58] Field of Search ............................. 385/49, 50, 52, 385/54, 31, 16, 90–91

[56] References Cited

U.S. PATENT DOCUMENTS

| | | | |
|---|---|---|---|
| 5,080,458 | 1/1992 | Hockaday | 385/14 |
| 5,481,632 | 1/1996 | Hirai et al. | 385/49 |
| 5,559,915 | 9/1996 | Deveau | 385/49 |

OTHER PUBLICATIONS

"High Reliability Optical Splitters Composed of Silica–Based Planar Lightwave Circuits", tokyo, No. 33 (1994), p71–p80, By Yoshinori Hibino, Fumiaki Hanawa, Hiroshi Nakagome, Motohaya Ishii and Norio Takato (no month).

"Technical Digest", 1995 Technical Digest Series vol. 7, By Deepak Sood, Mark Lowry, Shinn–yee Lu, Oliver T. Strand (no month).

*Primary Examiner*—John D. Lee
*Assistant Examiner*—Victoria D. Hao
*Attorney, Agent, or Firm*—Parkhurst & Wendel

[57] ABSTRACT

An outgoing light from a light source transmits a photo coupler, a single-fiber optical fiber array, an optical wave guide chip, a four-fiber optical fiber array and an optical fiber, and is reversed, and an outgoing light from another end of the photo coupler is received by a light receiving unit to roughly position the respective components. Thereafter, the four-fiber optical fiber array is positioned with respect to the optical wave guide chip in such a manner that the amount of light that reaches the light receiving unit becomes maximum. The adjustment of the optical axis is enabled with only a single light receiving unit without the use of plural expensive light receiving units, and the adjustment of the optical axis can be performed with ease in a short period of time.

8 Claims, 3 Drawing Sheets

METHOD OF ALIGNING OPTICAL WAVEGUIDE DEVICE

BACKGROUND OF THE INVENTION AND RELATED ART STATEMENT

The present invention relates to a method of manufacturing an optical wave guide device, and more particularly to a method of connecting an optical fiber array to an optical wave guide chip.

As the optical wave guide device, there have been known a 1×N branch device that branches a light in one optical fiber into lights for N optical fibers, an M×M switch device that distributes any light in M optical fibers to any one of M optical fibers, and so on.

Those optical wave guide devices are so designed as to connect the optical fibers to both ends of the optical wave guide chip section that performs the above function, and because several optical fibers are connected to both ends of the chip, an optical fiber array that has the optical fibers arrayed is used.

Up to now, as shown in FIG. 4, the connection of an optical wave guide chip (5) to optical fiber arrays (1, 3) is accomplished through a method in which a light is inputted from an optical fiber (7) on one end side of the optical wave guide chip (5), respective light receiving units (13) are connected to corresponding optical fibers (7) on an opposite end side of the optical wave guide chip (5), and the optical wave guide chip (5) and the optical fiber arrays (1, 3) are positioned so that the amount of received light of those light receiving units (13) becomes maximum before the respective units are fixed.

Pitches between the respective optical fibers are set to a predetermined value by use of the optical fiber array, and pitches between input/output ports of the branched waveguide on the optical wave guide chip are also set to a predetermined value. However, because of manufacturing fluctuations, the respective pitches and pitches between the optical fiber arrays and the optical wave guide chip 5 are not always identical. Therefore, even if one optical fiber on the optical fiber array can be connected to one of the branched waveguides so that the amount of transmitted light becomes maximum, the amount of transmitted light of the optical fiber which is connected to another branched waveguide cannot be always set to the same value. Accordingly, taking the manufacturing fluctuations into account, the optical fiber arrays and the optical wave guide chip need to be connected at a position where a whole sum of the amount of transmitted light of each of the plural optical fibers is maximum. Simultaneously, the amount of light is measured on the respective end surfaces of the plural optical fibers by the light receiving units, and while the amount of light from the respective optical fibers is compared with each other, or a total amount of the light is obtained, a relative position between the optical fiber arrays and the optical wave guide chip needs to be determined.

The present invention has been made in view of the above problem inherent in the prior art, and therefore an object of the present invention is to provide a method through which it is capable of adjusting an optical axis by a single light receiving unit without using a plurality of expensive light receiving units, and is also capable of adjusting the optical axis with ease in a short period of time.

SUMMARY OF THE INVENTION

According to the present invention, there is provided a method of aligning an optical wave guide device in which a first optical fiber array that holds at least one optical fiber and a second optical fiber array that arrays a plurality of optical fibers are connected to front and rear ends of an optical wave guide chip which is designed to branch at least one light into a plurality of lights, the method comprises:

optically connecting arbitrary two optical fibers arrayed in the second optical fiber array to each other in advance;

connecting a photo coupler to the optical fiber held by the first optical fiber array, locating a light source on one end of photo coupler, and locating a light receiving unit on another end paired with the one end thereof;

adjusting optical axes of the first optical fiber array and the optical wave guide chip so that the amount of an outgoing light from the light source which transmits the photo coupler, the first optical fiber array, and said optical waveguide chip, becomes maximum;

roughly adjusting the optical axes of the photo coupler, the first optical fiber array, the optical wave guide chip, the second optical fiber array, the optical fiber and the light receiving unit so that the outgoing light from the light source transmits the photo coupler, the first optical fiber array, the optical wave guide chip, the second optical fiber array and the optical fiber, and a reversed light reaches the light receiving unit through the optical fiber, the optical wave guide chip, the first optical fiber array and the photo coupler;

adjusting a position of the second optical fiber array with respect to the optical wave guide chip so that the amount of light that reaches the light receiving unit becomes maximum; and connecting the first and second optical fiber arrays to the optical wave guide chip.

Also, according to the present invention, there is provided a method of aligning an optical wave guide device in which a second optical fiber array that arrays a plurality of optical fibers is connected to a rear end of an optical wave guide chip which is structured so that at least one light is branched into a plurality of lights, the method comprises:

optically connecting arbitrary two optical fibers arrayed in the second optical fiber array to each other in advance;

disposing a first optical fiber array on a front end of the optical wave guide chip, connecting a photo coupler to an optical fiber held by the first optical fiber array, locating a light source on one end of the photo coupler, and locating a light receiving unit on another end paired with the one end thereof;

adjusting axes of the first optical fiber array and the optical wave guide chip so that the amount of an outgoing light from the light source which transmits the photo coupler, the first optical fiber array, and the optical waveguide chip, becomes maximum;

roughly adjusting the optical axes of the photo coupler, said first optical fiber array, the optical wave guide chip, the second optical fiber array, the optical fiber and the light receiving unit so that the outgoing light from the light source transmits the photo coupler, the first optical fiber array, the optical wave guide chip, the second optical fiber array, and the optical fiber, and a reversed light reaches the light receiving unit through the optical fiber, the optical wave guide chip, the first optical fiber array and the photo coupler;

adjusting a position of the second optical fiber array with respect to the optical wave guide chip so that the amount of light that reaches the light receiving unit becomes maximum; and connecting the second optical fiber array to the optical wave guide chip.

DESCRIPTION OF PREFERRED EMBODIMENTS

Figure 1:
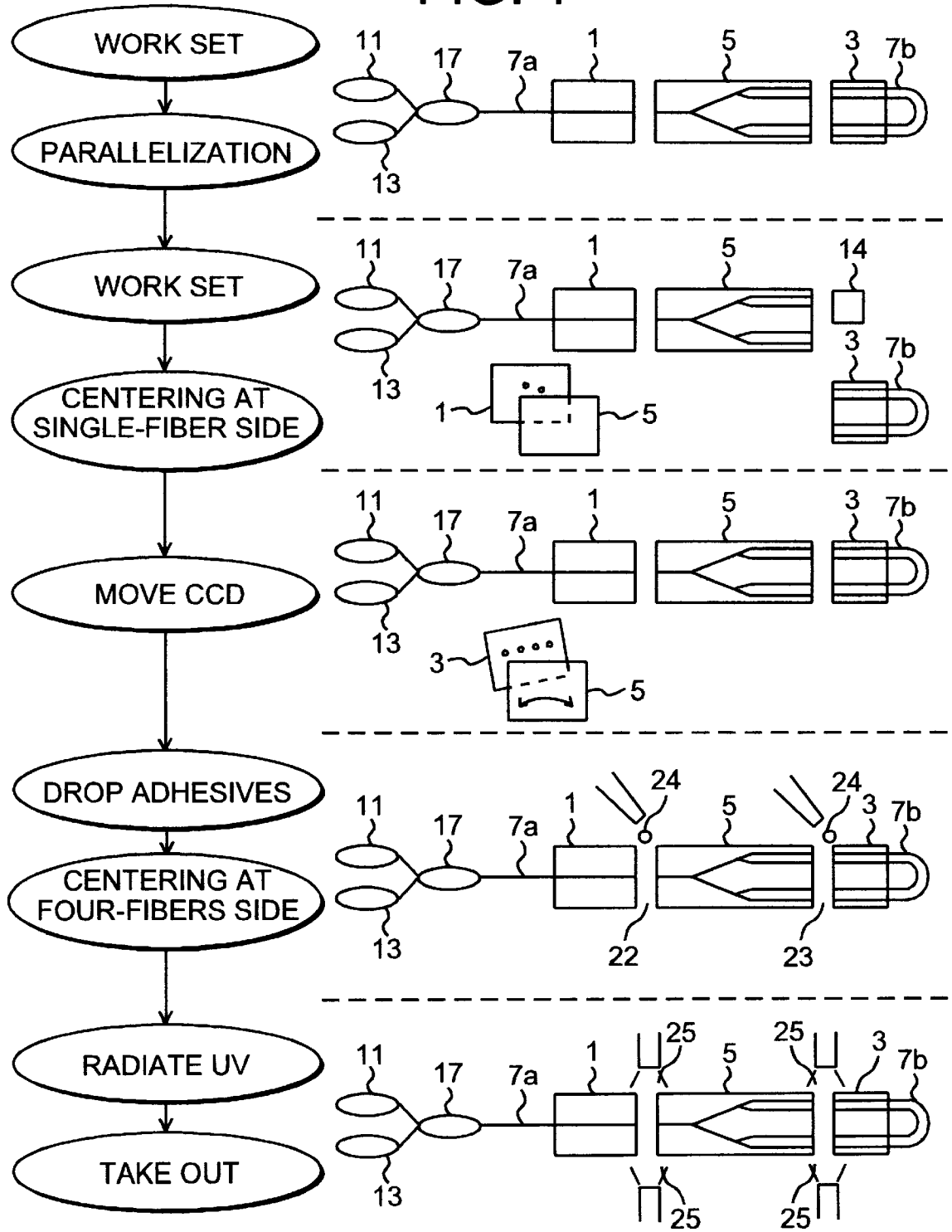
FIG. 1 is a step diagram showing an example of a method of manufacturing an optical wave guide device according to an embodiment of the present invention.

The present invention is directed to a method of aligning an optical wave guide device in which a first optical fiber array that holds at least one optical fiber is connected to a front portion of an optical wave guide chip which is structured to branch at least one light into a plurality of lights, and a second optical fiber array that arrays a plurality of optical fibers is connected to a rear portion of the optical wave guide chip (a first aspect of the present invention), and a method of aligning an optical wave guide device in which a second optical fiber array that arrays a plurality of optical fibers is connected to a plural-optical-fiber side end portion (a rear portion) of an optical wave guide chip which is structured so that at least one optical fiber is branched to a plurality of optical fibers (a second aspect of the present invention).

In other words, the present invention includes a method of connecting the optical fiber arrays to the front and rear portions of the optical wave guide chip, and a method of connecting the optical fiber array to only the rear portion of the optical wave guide chip.

Hereinafter, the first aspect of the present invention will be mainly described.

First, an optical fiber which is held by a first optical fiber array is connected with, for example, a 1×2 photo coupler. Incidentally, in the case of an M×M switch device having M optical fibers held by the first optical fiber array, a 1×2 photo coupler is connected to at least one of M optical fibers, a light source is located on one end of the photo coupler, and a light receiving unit is located on another end paired with the one end thereof.

In a second optical fiber array, arbitrary two optical fibers of optical fibers arrayed therein are optically connected to each other. In this case, the present invention is achieved by connecting the arbitrary two optical fibers to each other, however, it is preferable that optical fibers disposed outside are connected to each other because an accuracy in adjustment of the optical axis is improved.

Then, the optical axes of the first optical fiber array and the optical wave guide chip are adjusted. The adjustment of the optical axes is conducted by adjusting the first optical fiber array and the optical wave guide chip at a position where the amount of the outgoing light from the light source which transmits the photo coupler, the first optical fiber array and the optical wave guide chip, becomes maximum. A monitor device for monitoring the amount of light as used may be, for example, a CCD camera or the like. The CCD camera is disposed on the second optical fiber array side of the optical wave guide chip, and the outgoing light from the optical wave guide chip is monitored to position the first optical fiber array.

Then, a position of the second optical fiber array with respect to the optical wave guide chip is adjusted. The positional adjustment is conducted in such a manner that after the optical axes of the respective units are roughly adjusted so that the outgoing light from the light source transmitted to the photo coupler, the first optical fiber array, the optical wave guide chip, the second optical fiber array and the optical fiber, and the reverted light reaches the light receiving unit through the optical fiber, the optical wave guide chip, the first optical fiber array, and the photo coupler, the optical axes are adjusted to a position where the amount of light that reaches the light receiving unit becomes maximum.

After the first optical fiber array and the second optical fiber array are positioned with respect to the optical wave guide chip as described above, the first optical fiber array and the second optical fiber array are connected to the optical wave guide chip.

The connection of the first and second optical fiber arrays to the optical wave guide chip can be performed by using an adhesive. The adhesive is not limited to a particular kind and may be what is usually used. However, the use of an ultraviolet ray setting resin as the adhesive is preferable from the viewpoint of easy handling.

The above description is given of the first aspect of the present invention. On the other hand, according to the second aspect of the present invention, after the first optical fiber array and the second optical fiber array are positioned with respect to the optical wave guide chip, respectively, the second optical fiber array and the optical wave guide chip are connected to each other. In this way, only the second optical fiber array and the optical wave guide chip are connected without the connection of the first optical fiber array to the optical wave guide chip, thereby providing a method of aligning an optical wave guide device according to the second aspect of the present invention.

Hereinafter, a method of manufacturing an optical wave guide device according to an embodiment of the present invention will be described in more detail with reference to the accompanying drawings.

Figure 2:
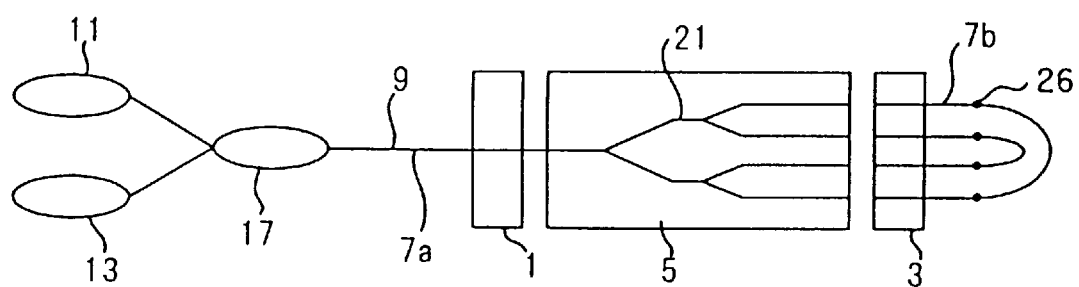
FIG. 2 is a schematic diagram showing an example of the embodiment of the present invention.
Figure 3:
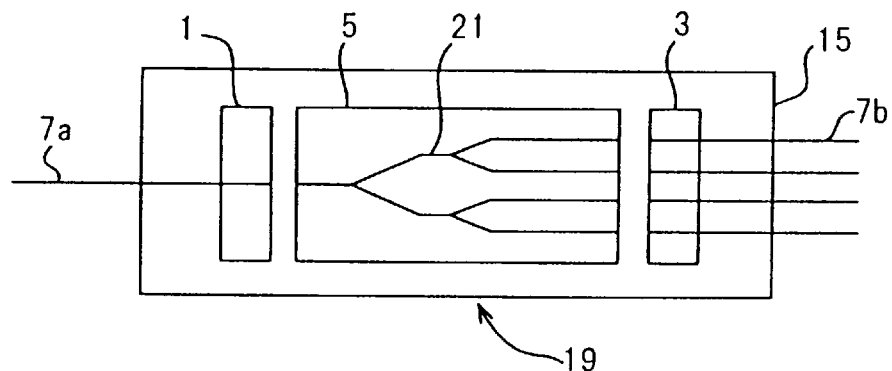
FIG. 3 is a schematic diagram showing a 1×4 branch/couple optical wave guide device which is assembled according to the embodiment shown in FIG. 2.
Figure 4:
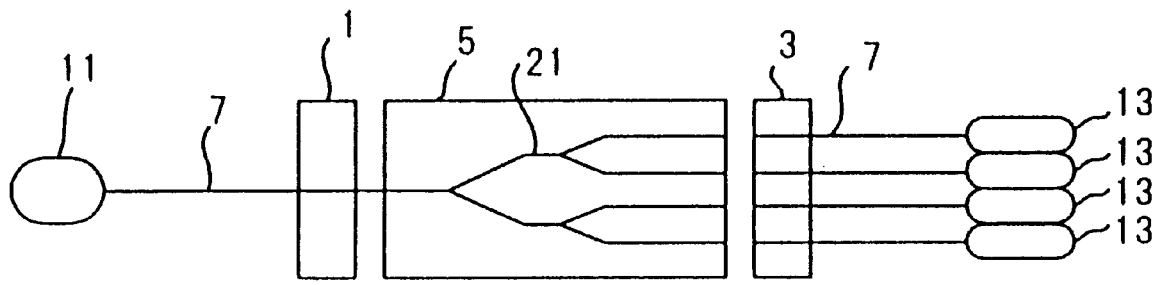
FIG. 4 is a schematic diagram showing a method of assembling a conventional 1×4 branch/couple optical wave guide device.

FIGS. 1 and 2 show an example of a method of aligning the optical wave guide device according to an embodiment of the present invention. FIG. 3 is a schematic diagram showing a 1×4 branch/couple optical wave guide device which is assembled according to the embodiment shown in FIG. 2.

As an optical wave guide chip section, there is used an optical wave guide chip (5) which is obtained in a manner that an optical wave guide (21) of 1×4 (250 μm in pitch) is formed on a glass substrate, and its end surface is optically ground. Of the optical fiber arrays, an optical fiber array holding four fibers (3), which is the second optical fiber array, is designed so that the optical fibers are mounted on a V-groove substrate 250 μ in pitch, and covered with a cap. The end surface of the optical fiber array (3) is also ground. An optical fiber array holding a single fiber (in this embodiment, called as "array" though it is a single fiber) (1) which is the first optical fiber array is designed so that an optical fiber is mounted on a single V-groove. An end surface of the fiber array is also ground.

On the beginning, a 1×2 photo coupler (17) was connected to an optical fiber (7a) of the single-fiber optical fiber array (1) by a fusing unit, and one core of the photo coupler is connected to a light source (11), and another core is connected to a light receiving unit (13). Reference numeral (9) denotes a fused portion.

As the above light source, there can be used, for example, a laser diode (LD).

Then, outer optical fibers of the optical fibers (7b) on the four-fiber optical fiber array (3) side are connected (fused) to each other, and middle optical fibers thereof are connected (fused) to each other by the fusing unit. Reference numeral (26) denotes a fused portion.

Then, an optical wave guide chip (5) is disposed apart from the single-fiber optical fiber array (1) by 50 μm, and a CCD camera (14) is disposed on the four-core side of the optical wave guide chip (5) so as to monitor an outgoing light from the respective input/output ports of the optical wave guide chip (5).

In this example, a distance between the single-fiber optical fiber array (1) and the optical wave guide chip (5) is set to 10 to 500 μm, in this embodiment, 50 μm, thereby being capable of conducting the adjustment of the optical axis in a short period of time. In other words, as the distance between the single-fiber optical fiber array (1) and the optical wave guide chip (5) is gradually increased, the outgoing light from the optical fiber is scattered, to thereby facilitate the receiving the scattered light.

Subsequently, while observing the respective components through the CCD camera (14), the single-fiber optical fiber array (1) is sequentially moved in X- and Y- directions and positioned where the outgoing light from the light source (11) is most inputted thereto. In FIG. 1, the circled portions in steps 2 and 3 illustrate side views of the single-fiber optical fiber array 1 and the optical wave guide chip 5, and the optical wave guide chip 5 on the optical fiber array 3, respectively.

Thereafter, a gap (22) between the single-fiber optical fiber array (1) and the optical wave guide chip (5) is set to 10 μm. As the distance between the single-fiber optical fiber array (1) and the optical wave guide chip (5) is gradually, decreased the amount of light increases producing advantage. On the other hand, as the distance between the single-core optical fiber array (1) and the optical wave guide chip (5) is gradually decreased, a stress caused by the adhesive is increased with the result that the device characteristic becomes disadvantageous.

A distance of 2 to 50 μm is desired as the distance that satisfies both of the above advantages, and it was set to 10 μm in this embodiment.

With the above process, the positioning of the single-fiber optical fiber array (1) is completed.

Then, the four-fiber optical fiber array (3) is disposed apart from the optical wave guide chip (5) by 50 μm. It is desirable that a distance between the four-fiber optical fiber array (3) and the optical wave guide chip (5) be set at 10 to 500 μm as in the above relation between the single-fiber optical fiber array (1) and the optical wave guide chip (5).

The four-fiber optical fiber array (3) was sequentially moved in the X- and Y- directions and positioned where the outgoing light from the light source (11) can be detected by the light receiving unit (13). Thereafter, a gap (23) between the four-fiber optical fiber array (3) and the optical wave guide chip (5) is set to 10 μm. It is desirable that the gap (23) be set at 2 to 50 μm for the same reason as that of the above gap (22) between the single-fiber optical fiber array (1) and the optical wave guide chip (5), and in this embodiment, the gap (23) is set to 10 μm.

Subsequently, a position at which the amount of light received by the light receiving unit (13) becomes maximum in a rotating direction θ of the four-fiber optical fiber array (3) is located. In this example, there is a situation in which the position of the X- and Y- directions maybe slightly shifted by θ rotation of the four-fiber optical fiber array (3), and therefore the adjustment of the X- and Y- directions is conducted, again.

The above adjustment is conducted several times so that the position of the four-fiber optical fiber array (3) where the amount of light becomes maximum, is obtained.

With the above process, the positioning of the four-fiber optical fiber array (3) is completed.

Finally, an ultraviolet ray setting resin (24) was placed in both of those gaps (the gap (22) between the single-fiber optical fiber array (1) and the optical wave guide chip (5), and the gap (23) between the four-fiber optical fiber array (3) and the optical wave guide chip (5)), and an ultraviolet ray (25) is irradiated onto the ultraviolet ray setting resin (24) so that the ultraviolet ray setting resin (24) is fixed. Thereafter, the fused portion (9) of the single-fiber side optical fiber is separated from the fused portion (26) of the four-fiber side optical fiber. It should be noted that in the embodiment of FIG. 1, after the core of the four-fiber optical fiber array is adjusted, the single-fiber optical fiber array, the four-fiber optical fiber array and the optical wave guide chip are fixed simultaneously. Alternatively, the single-fiber optical fiber array may be fixed to the optical wave guide chip before the adjustment of the four-fiber optical fiber array after the single-fiber optical fiber array is adjusted.

The integrated chip with the optical fibers is received in a package to fabricate a 1×4 branch/couple optical wave guide device.

On the other hand, the ultraviolet ray setting resin (24) may be placed in the gap (22) between the single-fiber optical fiber array (1) and the optical wave guide chip (5), and the gap (23) between the four-fiber optical fiber array (3) and the optical wave guide chip (5). However, after the ultraviolet ray (25) is irradiated only onto the ultraviolet ray setting resin (24) between the four-fiber optical fiber array (3) and the optical wave guide chip (5) to fix the gap (23), the fused portion (26) of the four-fiber side optical fiber is separated therefrom, thereby obtaining the optical wave guide device where the four-fiber optical fiber array (3) and the optical wave guide chip (5) are connected.

As the optical wave guide device in which the multi-fiber optical fiber array is connected to the optical wave guide chip as described above, there are a multi-channel light source module, a light switch, a light modulator and so on.

As is apparent from the above description, in this embodiment, only one light receiving unit is required, and the complicated comparison of the amount of light of plural optical fibers with each other, etc., is not required for positioning because of a single light receiving unit, with the result that the cost of the assembling equipment is reduced, and the productivity in assembly is improved.

The above embodiment is described using the 1×4 branch/ couple optical wave guide device. However, the present invention is not limited thereto, and it is understood that the present invention is applicable to an M×M switch device, a 1×2 optical fiber gyro device as disclosed in Japanese Utility Model Publication (Kokoku) No. 7-19710, or the like.

As is apparent from the above description, according to the present invention, there are advantages in that when positioning the optical wave guide chip which is designed to branch at least one light into a plurality of lights, and the second optical fiber array that arrays a plurality of optical fibers, only one light receiving unit is required, and the complicated comparison of the amount of light of plural optical fibers with each other, etc., is not required because of a single light receiving unit, with the results that the costs of the assembling equipment is reduced, and the productivity of assembling is improved.

What is claimed is:

1. A method of aligning an optical wave guide device in which a first optical fiber array comprising at least one optical fiber and a second optical fiber array comprising a plurality of optical fibers are connected to front and rear ends of an optical wave guide chip designed to branch at least one light into a plurality of lights, said method comprising steps of:

optically connecting two of the optical fibers in said second optical fiber array to each other;

connecting a photo coupler to the optical fiber held by said first optical fiber array, locating a light source on one end of said photo coupler, and locating a light receiving unit on another end paired with the one end thereof;

adjusting the optical axes of said first optical fiber array and said optical wave guide chip so that the amount of the outgoing light from said light source transmitted to said photo coupler, said first optical fiber array, and said optical wave guide chip, becomes maximum;

adjusting the optical axes of said photo coupler, said first optical fiber array, said optical wave guide chip, said second optical fiber array, said at least one optical fiber and said light receiving unit so that the outgoing light from said light source transmitted to said photo coupler, said first optical fiber array, said optical wave guide chip, said second optical fiber array and said at least one optical fiber, and the reversed light reaches said light receiving unit through said at least one optical fiber, said optical wave guide chip, said first optical fiber array and said photo coupler;

adjusting a position of said second optical fiber array with respect to said optical wave guide chip so that the amount of light reaching said light receiving unit becomes maximum; and connecting said first and second optical fiber arrays to said optical wave guide chip.

2. A method of manufacturing an optical wave guide device as claimed in claim 1, wherein said first optical fiber array is a single-fiber optical fiber array.

3. A method of manufacturing an optical wave guide device as claimed in claim 1, wherein said second optical fiber array is a four-fiber optical fiber array.

4. A method of manufacturing an optical wave guide device as claimed in claim 1, wherein two outer optical fibers out of the optical fibers arrayed in said second optical fiber array are connected to each other.

5. A method of aligning an optical wave guide device in which a second optical fiber array comprising a plurality of optical fibers is connected to a rear end of an optical wave guide chip structured so that at least one light is branched into a plurality of lights, said method comprising the steps of:

optically connecting two of the optical fibers in said second optical fiber array to each other;

disposing a first optical fiber array comprising at least one optical fiber on a front end of said optical wave guide chip, connecting a photo coupler to said at least one optical fiber, locating a light source on one end of said photo coupler, and locating a light receiving unit on another end paired with the one end thereof;

adjusting the optical axes of said first optical fiber array and said optical wave guide chip so that the amount of the outgoing light from said light source transmitted to said photo coupler, said first optical fiber array, and said optical wave guide chip, becomes maximum;

adjusting the optical axes of said photo coupler, said first optical fiber array, said optical wave guide chip, said second optical fiber array, said at least one optical fiber and said light receiving unit so that the outgoing light from said light source transmitted to said photo coupler, said first optical fiber array, said optical wave guide chip, said second optical fiber array and said at least one optical fiber, and the reversed light reaches said light receiving unit through said at least one optical fiber, said optical wave guide chip, said first optical fiber array and said photo coupler;

adjusting a position of said second optical fiber array with respect to said optical wave guide chip so that the amount of light reaching said light receiving unit becomes maximum; and connecting said second optical fiber array to said optical wave guide chip.

6. A method of manufacturing an optical wave guide device as claimed in claim 5, wherein said first optical fiber array is a single-fiber optical fiber array.

7. A method of manufacturing an optical wave guide device as claimed in claim 5, wherein said second optical fiber array is a four-fiber optical fiber array.

8. A method of manufacturing an optical wave guide device as claimed in claim 5, wherein two outer optical fibers out of the optical fibers arrayed in said second optical fiber array are connected to each other.

* * * * *